April 28, 1964 R. R. PADDICK ETAL 3,130,591
ELECTROMAGNETIC MOTORS
Filed Sept. 19, 1960 3 Sheets-Sheet 1

Inventors
Richard Raymond Paddick
Brian Thomas Henry Quarm
Anthony Wynn Hiscocks
By
Karl W. Flocks
Attorney April 28, 1964   R. R. PADDICK ETAL   3,130,591
ELECTROMAGNETIC MOTORS
Filed Sept. 19, 1960   3 Sheets-Sheet 3

Inventors
Richard Raymond Paddick
Brian Thomas Henry Quarm
Anthony Lynn Hiscocks
By
Karl W. Flocks
Attorney

United States Patent Office 3,130,591
Patented Apr. 28, 1964

3,130,591
ELECTROMAGNETIC MOTORS
Richard R. Paddick, Twyford, Brian T. H. Quarm, Hemel Hempstead, and Anthony W. Hiscocks, St. Albans, England, assignors, by mesne assignments, to The De Havilland Aircraft Company Limited, Hatfield, England, a company of Great Britain
Filed Sept. 19, 1960, Ser. No. 56,845
Claims priority, application Great Britain Oct. 10, 1959
15 Claims. (Cl. 74—5.46)

This invention relates to elemtromagnetic motors, including two relatively movable members, one of which carries a magnetic pole piece structure and the other of which carries a coil for connection to an electrical energising circuit.

Such electromagnetic motors have particular application to gyroscopic apparatus in which a gyroscopic rotor is mounted for rotation about a rotor axis in an inner frame member mounted for angular movement about a first axis normal to the rotor axis in a gimbal frame member mounted for angular movement about a second axis normal to the first axis and transverse to the rotor axis in an outer frame member. In this case there are electromagnetic torque motors for the inner and gimbal frame members, each torque motor having its pole piece structure carried by a frame member and its coil carried by another frame member.

According to the invention, the pole piece structure of an electromagnetic motor has substantially planar parallel faces defining therebetween a space in which is a magnetic field, and the coil includes force-generating conductor elements which extend across the flux path in the field and are relatively movable, upon relative movement of the members, in a plane parallel to and between the faces of the pole piece structure.

Preferably, the members are angularly movable and the pole piece structure is arcuate to form a part annular space.

Conveniently, the pole piece structure includes a pair of pole pieces which extend in the direction of relative movement. In this case, the conductor elements of the coil which connect up the transverse force-generating conductor elements extend transversely to the direction of relative movement and surround a pole piece.

The structure may include an additional pole piece extending in the direction of relative movement and having a substantially planar face parallel to a planar face of one pole piece defining therebetween a space in which is a magnetic field and an additional coil carried by the other member includes force-generating conductor elements which extend across the flux path in the field and are relatively movable, upon relative movement of the members, in a plane parallel to and between the faces of the pole piece structure. In this case the coils may conveniently surround the outer pole pieces. Further, the coils are preferably connected in series.

In an alternative embodiment, the conductor elements of the coil which connect up the transverse force-generating conductor elements include longitudinal elements which extend in the direction of relative movement to beyond the magnetic pole piece structure.

Preferably, the longitudinal elements are themselves connected by transverse conductor elements external to the space in which the force-generating conductor elements are disposed. Such transverse elements may themselves constitute force-generating conductor elements disposed in a space between substantially planar parallel faces of an additional pole piece structure of reverse polarity.

Conveniently, the connecting conductor elements are disposed to form flanges of an I-shape section, part of the web of which is formed by the transverse conductor elements. In this case, a stiffener may extend between the transverse conductor elements to complete the web.

In its application to gyroscopic apparatus, the invention involves the provision of two torque motors, the pole piece structure of each torque motor having substantially planar parallel faces defining therebetween a part annular space in which is a magnetic field, and the coil of each torque motor including force-generating conductor elements which extend across the flux path in the field and are relatively movable, upon relative movement of the members, in a plane parallel to and between the faces of the pole piece structure.

Preferably, the gimbal frame member carries the coils of both torque motors.

Figure 1:
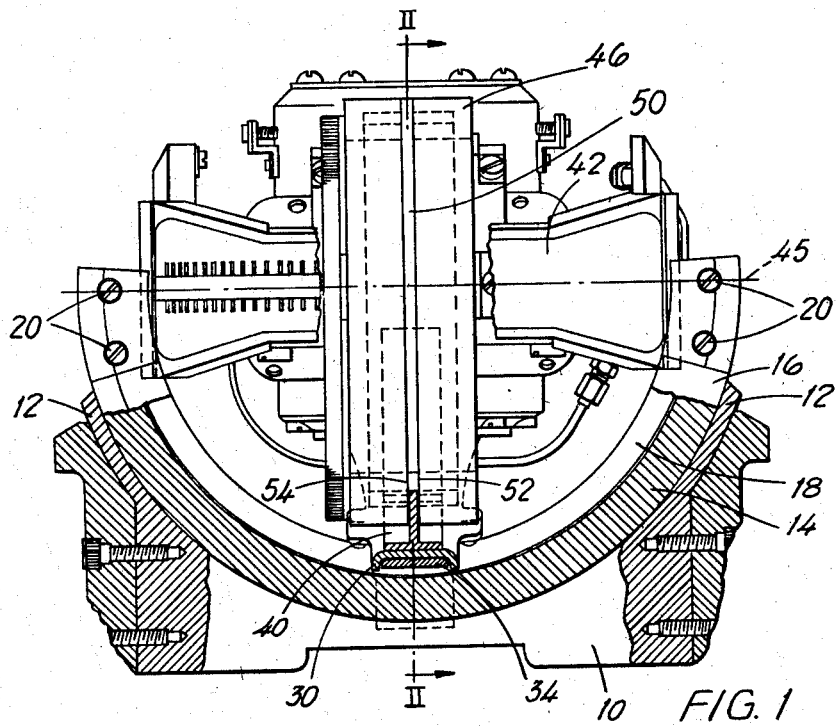
FIGURE 1 is a side view partly in section and partly broken away, of gyroscopic apparatus incorporating electromagnetic torque motors according to the invention.
Figure 2:
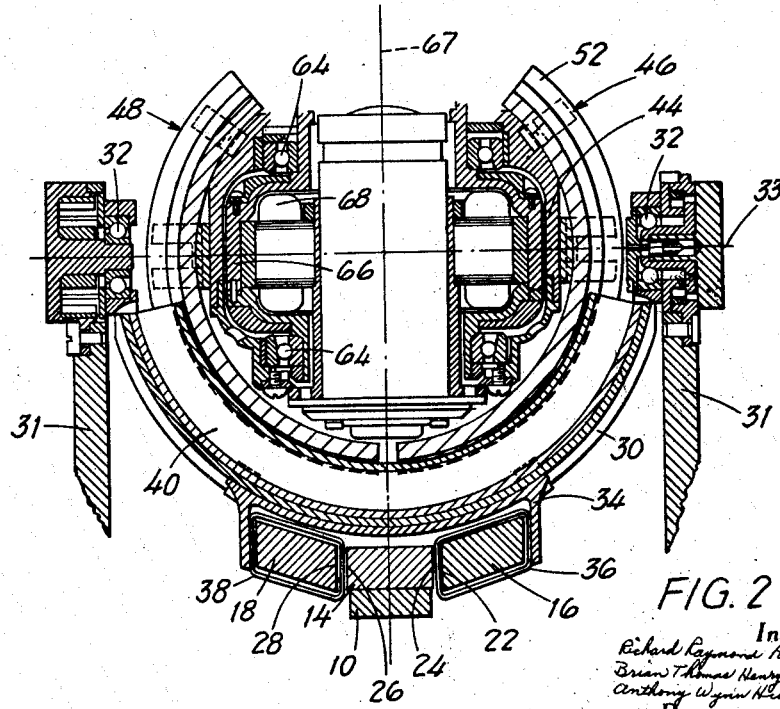
FIGURE 2 is a section on the line II—II of FIGURE 1.

The outer frame member of the gyroscopic apparatus includes a base plate 10 which has two curved arms 12 and to which is secured the central pole piece 14 of three parallel pole pieces 14, 16 and 18. The pole piece 14 is rectangular in cross section and of long arcuate form in side view (FIGURE 1). Attached to the ends of the pole piece 14 by bolts 20 are the ends of the pole pieces 16 and 18. These are also of long arcuate form in side view but are parallelogrammic in cross section (FIGURE 2). The pole pieces have substantially planar parallel faces 22, 24, 26 and 28. The faces 22 and 24 define therebetween a part annular space in which there is a magnetic field, the magnetisation of the pole piece 14 being across the width thereof. The faces 26 and 28 define a similar space.

Figure 4:
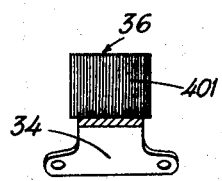
FIGURE 4 is a section on the line IV—IV of FIGURE 3.

An arcuate gimbal frame member 30 is mounted in ball bearings 32 on arms 31 connected to the base plate 10 for pivotation about the centre of the arcuate pole pieces, that is, about the axis 33. To the centre of the frame member 30 is secured a bracket 34, carrying two coils 36 and 38. Each coil consists of a conductor wound around a former of parallelogrammic cross section and is secured by an epoxy resin in the bracket 34. The conductor of the coil 36 includes force-generating conductor elements 401 (FIGURE 4) which extend across the flux path in the magnetic field between the faces 22 and 24 of the pole piece structure. Similarly the conductor of the coil 38 has force-generating conductor elements which extend across the flux path in the magnetic field between the faces 26 and 28. The conductor elements which connect up the transverse force-generating conductor elements surround the appropriate pole piece.

As the frame member 30 is pivoted relative to the base plate 10, the coils are movable with the frame member along the pole pieces. During such angular movement, the force-generating conductor elements move in a plane parallel to and between the faces of the pole pieces. The faces are therefore accurately parallel not only with each other but with the coil faces as well. The coils 36 and 38 are connected in series so that current flows through the force-generating conductor elements in the same direction. Extending from the ends of the frame member 30 is a ring 42 which supports bearings for an inner frame member 44. The frame member 44 is pivoted about an axis 45 which is normal to the axis 33 about which the frame member 30 is pivoted.

Figure 6:
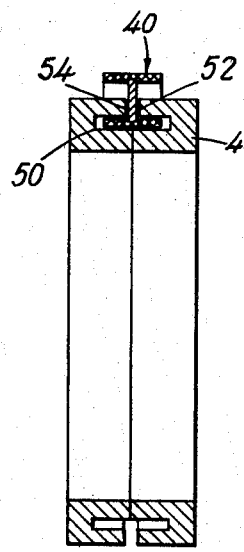
FIGURE 6 is a section of the other torque motor.

The frame member 44 supports a pair of magnetic pole pieces 46 and 48. Each pole piece is built up of two halves which together form a pole piece having an inverted T-shape groove 50 (FIGURE 6). The pole pieces are of arcuate form centred about the axis 45 and have planar parallel faces 52 and 54. The faces 52 and 54 define therebetween a part annular space in which there is a magnetic field, the magnetisation of the pole piece being across the width thereof. The pole pieces 46 and 48 are of reverse polarity, of equal length and of close end-to-end proximity.

Figure 7:
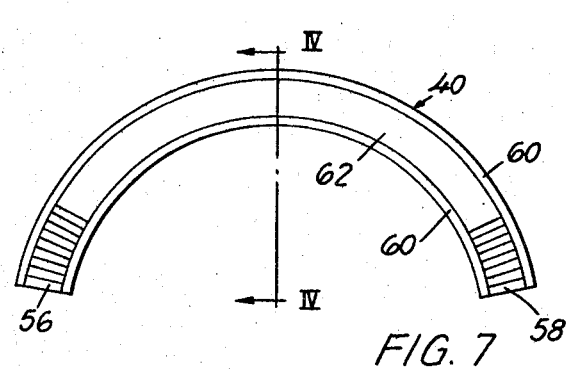
FIGURE 7 is a side view of the coil of the other torque motor shown in FIGURES 1 and 2.
Figure 9:
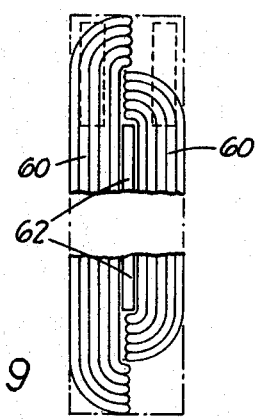
FIGURE 9 is a diagrammatic view, to an enlarged scale, of the top of the coil of FIGURES 7 and 8.
Figure 8:
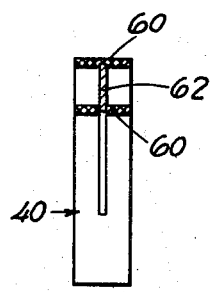
FIGURE 8 is a section on the line IV—IV of FIGURE 7.

Secured to the inside of the frame member 30 is an arcuate coil 40. The arcuate coil 40 is I-shape in section, one flange being disposed in the groove 50, one flange external to the pole pieces and the web being disposed in the space between the faces 52 and 54. Adjacent its ends the web is formed by force-generating conductor elements 56 and 58 (FIGURE 7). The conductor elements 56 lie in the space in the pole piece 46 and the conductor elements 58 in the space in the pole piece 48. The conductor elements 56 and 58 are disposed transverse to the direction of relative movement parallel to the planar faces and are connected by connecting conductor elements 60 (FIGURE 9) which extend in the direction of relative movement and are bent over on either side of the web to form the flanges of the I-shape section. Between the conductor elements 56 and 58 is disposed an arcuate stiffener 62 to complete the web.

As the pole pieces 46 and 48 and bracket 44 are pivoted relative to the frame member 30, the pole pieces are movable with the bracket along the coil. During such angular movement, the pole piece faces move in planes parallel, to and on either side of the force-generating conductor elements of the coil.

The frame member 44 carries ball bearings 64 in which a gyroscope rotor 66 is rotatable about an axis 67 normal to the axis 45. The rotor 66 is hollow and contains a wound stator 68 mounted on the frame member 44.

In use, the stator 68 is continuously supplied with electrical current so that the gyroscope rotor 66 is continuously driven at high rotational speed. This stabilises the gyroscope rotor axis 67 in space. If it is desired to move the axis 67 angularly about the axis 33 then the coil 40 is supplied with current from an electrical energising circuit. This current flowing through the force-generating conductor elements in the magnetic fields produces a force tending to pivot the pole pieces 46 and 48 about the axis 45. This is resisted by the gyroscopic effect of the rotation of the rotor 66, which is precessed about the axis 33 normal to the axis 45.

If it is desired to move the axis 67 angularly about the axis 45, then the coils 36 and 38 are supplied with current from an electrical energising circuit. This current flowing through the force-generating conductor elements 401 in the magnetic fields produces a force tending to pivot the frame member 30 about the axis 33. This is resisted by the gyroscopic effect of the rotation of the rotor 66 which is precessed about the axis 45 normal to the axis 33.

The force obtained about either axis is dependent in direction and magnitude upon the direction and magnitude of the current supplied. Current may be supplied simultaneously to the coils of both torque motors. The currents may also be varied so as to obtain a cyclic movement of the axis 67, for example about the surface of a cone.

It will be appreciated that, due to the parallel nature of the pole piece faces and co-operating force-generating conductor elements, a substantially constant torque-current relationship is obtained, whatever the position of the coil on the pole piece. The pole pieces are magnetised evenly along their length so that the flux density remains substantially constant between the ends of the arcuate spaces.

Figure 5:
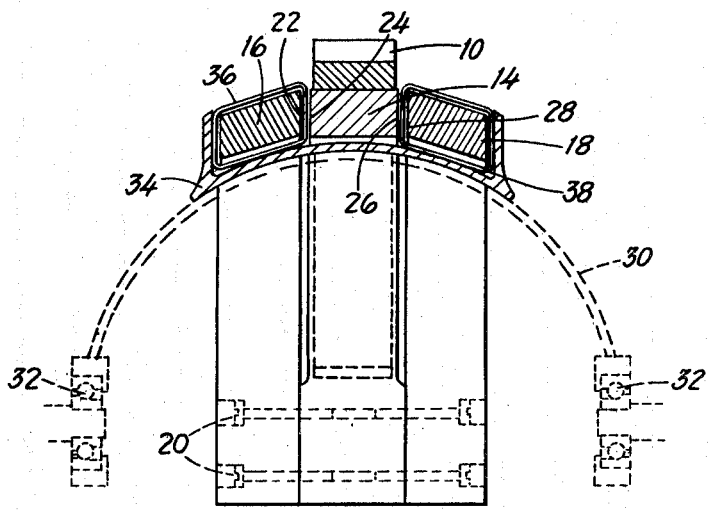
FIGURE 5 is a section of the torque motor only on the line II—II of FIGURE 1.
Figure 3:
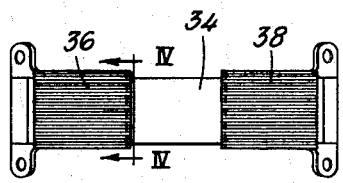
FIGURE 3 is a plan view from below of the coils of one torque motor shown in FIGURE 2.

The torque motors have application to apparatus other than the gyroscopic apparatus described. Thus in the torque motors illustrated in FIGURES 3, 4 and 5, the coil-carrying member 30 may carry the wiper arm of a potentiometer for example in an electrical control system. The member 30 is capable of considerable angular movement relative to the base plate 10, although a full 360° movement is prevented by the necessity to support the pole pieces surrounded by the coils.

It will be understood that, although the arrangement described is preferred, the member carrying the coils could be made stationary and the member carrying the pole piece structure angularly movable.

In the torque motor illustrated in FIGURES 6, 7, 8 and 9, the frame member 44 and pole pieces 46 and 48 are capable of angular movement up to just short of 180° due to the necessity for two aligned pole pieces, the lengths of the force-generating conductor elements in the direction of movement and the gaps between the pole pieces. This motor is particularly useful where it is not possible for the conductor elements of the coil to surround the pole pieces.

It will be understood that, although the arrangement described is preferred, the member carrying the coil could be made angularly movable and the member carrying the pole piece structure stationary.

Either of the motors could be used as a slave motor in a servo or control system or as a large deflection indicating meter.

We claim:
1. Gyroscopic apparatus comprising a gyroscopic rotor, an inner frame member in which the rotor is mounted for rotation about a rotor axis a gimbal frame member in which the inner frame member is mounted for angular movement about a first axis normal to said rotor axis, an outer frame member in which the gimbal frame member is mounted for angular movement about a second axis normal to said first axis and transverse to said rotor axis, a magnetic-circuit structure carried by said outer frame member and having three limbs extending in the direction of relative movement with substantially planar parallel pole faces defining therebetween two air-gaps in which are uniform and unidirectional magnetic fields, and two coils carried by said gimbal frame member and including force generating conductor elements which extend across the flux path in the fields and are relatively movable, upon relative movement of the outer and gimbal frame members, in a plane parallel to and between the faces of the magnetic-circuit structure.

2. Gyroscopic apparatus as claimed in claim 1, wherein the coils also include current-conducting elements which connect up the transverse force-generating conductor elements, extend transversely to the direction of relative movement and surround said outer limbs.

3. An electromagnetic motor comprising two members relatively movable about an axis, first and second elongate and arcuate magnetic-circuit structures extending about said axis and carried by one of said members, each of said magnetic-circuit structures having substantially planar parallel faces defining in said first structure a first elongate arcuate air-gap and in said second structure a second elongate arcuate air-gap, each of said air-gaps extending about said axis, said structures being uniformly permanently magnetised in relatively opposite senses so as to produce within each of said air-gaps a transverse unidirectional magnetic field of substantially constant flux density along the length of that air-gap, first force-generating conductor elements extending radially of said axis through said first air-gap, second force-generating conductor elements extending radially of said axis through said second air-gap, said first and second force-generating conductor elements being carried by the other of said members, and current-conducting elements extending in the direction of relative movement of said members and interconnecting said first and second force-generating conductor elements to form a coil.

4. An electromagnetic motor according to claim 3 wherein said current-conducting elements are disposed to form the flanges of an I-shape section having a web, a part of said web being fomed by said first and second force generating conductor elements.

5. An electromagnetic motor according to claim 4 including a stiffener extending between said first and second force generating conductor elements to complete said web.

6. An electromagnetic motor according to claim 4 wherein the current-conducting elements forming one of said flanges of the I-shape section extend within both said first and second magnetic-circuit structures and the current-conducting elements forming the other of said flanges of the I-shape section are disposed externally of said first and second magnetic-circuit structures.

7. Gyroscopic apparatus including a gyroscopic rotor, an inner frame member in which the rotor is mounted for rotation about a rotor axis, a gimbal frame member in which the inner frame member is mounted for angular movement about a first axis normal to said rotor axis, an outer frame member in which said gimbal frame member is mounted for angular movement about a second axis normal to said first axis and transverse to said rotor axis, first and second arcuate structures of mutually reverse polarities carried by said inner frame member and disposed in end to end proximity and extending about and centred on said first axis, each of said first and second structures being uniformly magnetised and each having two substantially planar parallel pole faces spaced in the direction of length of said first axis and defining, in said first structure, a first air-gap across which transversely extends a first uniform and unidirectional magnetic field and, in said second structure, a second air-gap across which transversely extends a second uniform and unidirectional magnetic field, a first set of force generating conductor elements extending radially of said first axis across the flux path in said first field, a second set of force generating conductor elements extending radially of said first axis across the flux path in said second field, said force generating conductor elements of said first and second sets being carried by said gimbal frame member for respective displacement in said first and second air-gaps in a plane parallel to said planar faces by relative movement of said gimbal frame member and said inner member, longitudinal arcuate current-conducting elements extending about and centred on said first axis and connecting said force generating conductor elements of said first and second sets to form a first coil, a third magnetic-circuit structure carried by said outer frame member and including two outer limbs and an inner limb disposed between said outer limbs, said outer and inner limbs being arcuate and extending about and centred on said second axis and having substantially planar parallel pole faces defining between one outer limb and said inner limb a third air-gap across which transversely extends a uniform and unidirectional magnetic field and between the other of said outer limbs and said inner limb a fourth air-gap across which transversely extends a uniform and unidirectional magnetic field, third and fourth sets of force generating elements carried by said inner frame member and extending respectively across the flux path of the field in said third and fourth air-gaps and normally to said second axis and to the direction or relative movement between said inner and outer members for movement in the associated air-gap relative to the pole faces defining the associated air-gap in a plane parallel to the pole faces upon relative movement of the inner and outer members, further current-conducting elements connecting the force generating elements of said third set to form a second coil surrounding said one outer limb and additional current-conducting elements connecting the force generating elements of said fourth set to form a third coil surrounding said other outer limb.

8. An electromagnetic motor comprising two members relatively movable about an axis, a magnetic-circuit structure carried by one of said members and including a pair of elongate arcuate limbs which extend co-axially about said axis and which have each a substantially planar pole face spaced axially of and parallel with the other planar pole face to define between the planar pole faces an elongate arcuate air-gap extending about and centered on said axis, at least one of said limbs being permanently magnetised uniformly of its length to produce across said air-gap a unidirectional magnetic-field extending normal to said planar pole faces and of substantially constant flux density along the length of said air-gap, and force-generating conductor elements carried by the other of said members and extending radially of said axis through said air-gap.

9. An electromagnetic motor as claimed in claim 8, in which only one of said two limbs is permanently magnetised, that limb being uniformly magnetised transversely of its length.

10. An electromagnetic motor as claimed in claim 9, in which said two limbs are joined at their corresponding extremities, the motor including current-conducting elements connecting said force-generating conductor elements to form a coil surrounding that one of the two said limbs which is not permanently magnetised.

11. An electromagnetic motor comprising two members relatively movable about an axis, a magnetic-circuit structure carried by one of said members and including an inner limb disposed between two outer limbs, said inner and outer limbs being elongate and arcuate and extending co-axially about said axis and having adjacent faces which are substantially planar parallel faces defining between said inner limb and one of said outer limbs a first air-gap and between said inner limb and the other of said outer limbs a second air-gap, said air-gaps being elongate and arcuate and extending co-axially about said axis, and said inner limb being uniformly permanently magnetised transversely of its length so as to produce within each of said air-gaps a transverse unidirectional magnetic field of substantially constant flux density along the length of that air-gap, separate force-generating conductor elements carried by the other of said members and associated with each of said air-gaps so as to extend radially of said axis through the associated air-gap, current-conducting elements connecting the force-generating conductor elements associated with said first air-gap to form a first coil surrounding said one outer limb, and further current-conducting elements connecting the force-generating conductor elements associated with said second air-gap to form a second coil surrounding said other outer limb.

12. An electromagnetic motor as claimed in claim 11, in which said first and second coils are so connected together in series, that current will flow through said force-generating conductor elements in the same direction.

13. An electromagnetic motor as claimed in claim 8, in which both of said two limbs are permanently magnetised, each limb being uniformly magnetised transversely of its length.

14. An electromagnetic motor according to claim 8, wherein the two limbs are disposed in juxtaposition and shaped to define therebetween an elongate channel of inverted T-section, the upright of which T-section channel is constituted by said air-gap, and wherein a first set of current-conducting elements is disposed within the crosspiece of said T-section channel and extends lengthwise of said magnetic-circuit structure to connect the one ends of said force-generating conductor elements, and a second set of current-conducting elements is disposed externally of said magnetic-circuit structure and extends lengthwise thereof to connect the other ends of said force-generating conductor elements.

15. Gyroscopic apparatus including a gyroscopic rotor, an inner frame member in which the rotor is mounted for rotation about a rotor axis, a gimbal frame member in which the inner frame member is mounted for angular movement about a first axis normal to said rotor axis, an outer frame member in which said gimbal frame member is mounted for angular movement about a second axis normal to said first axis and transverse to said rotor axis, first and second arcuate magnetic-circuit structures of mutually reverse polarities carried by said inner frame member and disposed in end-to-end proximity and extending about and centered on said first axis, each of said first and second magnetic-circuit structures being uniformly magnetised and each having two substantially planar parallel pole faces spaced in the direction of length of said first axis and defining, in said first structure, a first air-gap across which transversely extends a first uniform and unidirectional magnetic field and, in said second structure, a second air-gap across which transversely extends a second uniform and unidirectional magnetic field, a first set of force-generating conductor elements extending radially of said first axis across the flux path in said first field, a second set of force-generating conductor elements extending radially of said first axis across the flux path in said second field, said force-generating conductor elements of said first and second sets being carried by said gimbal frame member for respective displacement in said first and second air-gaps in a plane parallel to said planar faces by relative movement of said gimbal frame and said inner member, and longitudinal arcuate current-conducting elements extending about and centered on said first axis and connecting said force-generating conductor elements of said first and second sets to form a coil.

References Cited in the file of this patent

UNITED STATES PATENTS

| | | |
|---|---|---|
| 1,893,377 | Rose | Jan. 3, 1933 |
| 2,682,773 | Ward | July 6, 1954 |
| 2,868,021 | Sedgefield et al. | Jan. 13, 1959 |

FOREIGN PATENTS

| | | |
|---|---|---|
| 593,733 | Great Britain | Oct. 24, 1947 |